(12) United States Patent
Glöge

(10) Patent No.: US 11,543,680 B2
(45) Date of Patent: Jan. 3, 2023

(54) SPECTACLE LENS AND METHOD FOR PRODUCING SAME

(71) Applicant: Carl Zeiss Vision International GmbH, Aalen (DE)

(72) Inventor: Thomas Glöge, Schorndorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 936 days.

(21) Appl. No.: 16/383,555

(22) Filed: Apr. 12, 2019

(65) Prior Publication Data

US 2019/0235275 A1 Aug. 1, 2019

Related U.S. Application Data

(63) Continuation of application No. PCT/EP2017/076590, filed on Oct. 18, 2017.

(30) Foreign Application Priority Data

Oct. 20, 2016 (EP) ..................................... 16194893

(51) Int. Cl.
*G02C 7/02* (2006.01)
*G02B 1/04* (2006.01)
(Continued)

(52) U.S. Cl.
CPC ............ *G02C 7/022* (2013.01); *B29C 64/393* (2017.08); *B33Y 10/00* (2014.12); *B33Y 50/02* (2014.12);
(Continued)

(58) Field of Classification Search
None
See application file for complete search history.

(56) References Cited

U.S. PATENT DOCUMENTS 4,300,821 A 11/1981 Mignen
6,103,148 A 8/2000 Su et al.
(Continued)

FOREIGN PATENT DOCUMENTS

DE 3007572 C2 12/1982
DE 102008041869 A1 3/2010
(Continued)

OTHER PUBLICATIONS

Office action by the Chinese Patent Office issued in CN 201780064494.1, which is a counterpart application hereof, dated Oct. 10, 2020, and English-language translation thereof.
(Continued)

*Primary Examiner* — Darryl J Collins
(74) *Attorney, Agent, or Firm* — Tautz & Schuhmacher LLC; Georg Hasselmann

(57) ABSTRACT

A spectacle lens includes a first volume element group containing a plurality of first volume elements. The plurality of first volume elements is made from a material with a first Abbe number in the form of grid points of a geometric grid. Further, the spectacle lens includes a second volume group containing a plurality of second volume elements, which form a second partial grid in the form of grid points of a geometric grid, the second volume elements being made of a second material having a second Abbe number, wherein the first Abbe number and the second Abbe number differ from each other. The first partial grid and the second partial grid are arranged offset from each other. The disclosure also relates to a corresponding computer-implemented method for designing a spectacle lens of the type and to a method for producing the type of spectacle lens.

20 Claims, 4 Drawing Sheets

(51) Int. Cl.
| | |
|---|---|
| *B33Y 10/00* | (2015.01) |
| *B33Y 80/00* | (2015.01) |
| *B29C 64/393* | (2017.01) |
| *B33Y 50/02* | (2015.01) |
| *G02C 7/06* | (2006.01) |
| *B29L 11/00* | (2006.01) |
| *G02B 3/10* | (2006.01) |

(52) U.S. Cl.
CPC .............. *B33Y 80/00* (2014.12); *G02B 1/041* (2013.01); *G02C 7/028* (2013.01); *G02C 7/06* (2013.01); *B29L 2011/0016* (2013.01); *G02B 3/10* (2013.01)

(56) References Cited

U.S. PATENT DOCUMENTS

| | | | |
|---|---|---|---|
| 8,425,035 | B2 | 4/2013 | von Blanckenhagen |
| 8,591,026 | B2 | 11/2013 | Conte et al. |
| 9,086,569 | B1 | 7/2015 | Cakmakci et al. |
| 9,176,329 | B2 | 11/2015 | Kelch |
| 9,417,461 | B2 | 8/2016 | Kelch |
| 10,845,619 | B2 * | 11/2020 | Mappes .................. G02C 7/06 |
| 11,175,517 | B2 * | 11/2021 | Mappes .................. G02C 7/06 |
| 2005/0046957 | A1 | 3/2005 | Lai et al. |
| 2013/0003186 | A1 | 1/2013 | Beadie et al. |
| 2015/0153589 | A1 | 6/2015 | Meschenmoser et al. |
| 2015/0361286 | A1 | 12/2015 | Williams |
| 2016/0039208 | A1 | 2/2016 | Van De Vrie et al. |
| 2016/0167299 | A1 | 6/2016 | Jallouli et al. |

FOREIGN PATENT DOCUMENTS

| | | |
|---|---|---|
| DE | 102009004377 A1 | 7/2010 |
| DE | 102010047846 A1 | 4/2012 |
| DE | 102012102743 A1 | 10/2013 |
| EP | 955147 A1 | 11/1999 |
| EP | 2692941 A1 | 2/2014 |
| GB | 487546 A | 6/1938 |
| JP | 53013107 A | 2/1978 |
| JP | 2004157487 A | 6/2004 |
| JP | 2008191186 A | 8/2008 |
| WO | 0155752 A1 | 8/2001 |
| WO | 2010109154 A1 | 9/2010 |
| WO | 2014179780 A1 | 11/2014 |
| WO | 2015014381 A1 | 2/2015 |
| WO | 2015102938 A1 | 7/2015 |

OTHER PUBLICATIONS

Office action by the Canadian Patent Office in CA 3,040,047, which is a counterpart application hereof, dated Apr. 7, 2020.
Office action by the Korean Patent Office in KR 102019060866A, which is a counterpart application hereof, dated Jul. 29, 2019, along with a machine translation.
Charman "Hybrid diffractive-refractrive achromatic spectacle lenses" Ophthal. Physiol. Opt., vol. 14, pp. 389-392, Oct. 1994.
Diepes et al. "Optik und Technik der Brille" ["Optics and Technology of Spectacles"], Optische Fachveröffentlichung GmbH, Heidelberg, Germany, 2005, Chapter 5.3, see paragraph [0012] of the instant specification for relevance.
Witt "Wie funktionieren Achromat und Apochromat? Teil 1: Von der Einzellinse zum Achromaten" ["How do achromal and apochromat function? From single lens element to achromat"], Sterne und Weltraum, Oct. 2005, pp. 72 to 75, see paragraph [0021] of the instant specification for relevance.
Witt "Wie funktionieren Achromat und Apochromat? Teil 2: Vom Achromaten zum Apochromaten" ["How do achromat and apochromat function? Part 2: from achromat to apochromat]", Sterne und Weltraum, Dec. 2005, pp. 76 to 79, see paragraph [0021] of the instant specification for relevance.
Schott "Optical Glass 2018," Product Catalog, 2018.
Internet citation "Uebersicht-der-aktuellen-3d-druckverfahren—Overview of current 3D printing methods," retrieved from the Internet:< URL: 3druck.com/grundkurs-3d-drucker/teil-2-uebersicht-der-aktuellen-3d-druckverfahren-462146>, last accessed Apr. 12, 2019, see paragraph [0073] of the instant specification for relevance.
Internet citation "What is PolyJet Technology for 3D Printing? | Stratasys," retrieved from the Internet:< URL: www.stratasys.com/polyjet-technology>, last accessed Apr. 12, 2019.
Internet citation "PolyJet," retrieved from the Internet:< URL: www.materialise.com/en/manufacturing/3d-printing-technology/polyjet >, last accessed Apr. 12, 2019.
Internet citation "MultiJet Modeling," retrieved from the Internet:< URL: de.wikipedia.org/wiki/Multi_Jet_Modeling>, last accessed Apr. 12, 2019, see paragraph [0075] of the instant specification for relevance.
"Optics and optical instruments—Reference wavelengths (ISO 7944: 1998)," see paragraph [0013] of the instant specification for relevance.
"Ophthalmic optics—Spectacle lenses—Vocabulary (ISO 13666:2012)," German and English version EN ISO 13666:2012, Oct. 2013.
Extended European Search Report for EP 16194893.0, to which this application claims priority, dated Apr. 21, 2017.
International Search Report and Written Opinion for PCT/EP2017/076590, to which this application claims priority, dated Jan. 30, 2018.
International Preliminary Report on Patentability for PCT/EP2017/076590, to which this application claims priority, dated Jan. 29, 2019.
Office action by the European Patent Office in EP 16194893.0, to which this application claims priority, dated May 2, 2018.

* cited by examiner

SPECTACLE LENS AND METHOD FOR PRODUCING SAME

CROSS REFERENCE TO RELATED APPLICATIONS

This application is a continuation application of international application PCT/EP2017/076590, filed on Oct. 18, 2017, which claims priority to European patent application EP 16194893.0, filed on Oct. 20, 2016, both of which are hereby incorporated by reference in their entireties.

TECHNICAL FIELD

The disclosure relates to a spectacle lens having first and second volume element groups that are arranged on grid points of two partial grids penetrating each other, and to a computer-implemented method for designing such a spectacle lens.

BACKGROUND

Spectacle lenses are known in many variations from the related art. There are spectacle lenses without nominal dioptric power and correction spectacle lenses, that is to say spectacle lenses having dioptric power. Dioptric power, according to DIN EN ISO 13666, Section 9.3, is the collective term for the focusing and the prismatic power of a spectacle lens.

In the case of correction spectacle lenses, a distinction is drawn between single-vision spectacle lenses and multifocal spectacle lenses. A single-vision spectacle lens is a spectacle lens in which only one dioptric power is present in respect of the design. A multifocal spectacle lens is a spectacle lens in which two or more visibly different parts having different focusing powers are present in respect of the design. Importance is attached in particular to bifocal spectacle lenses, namely multifocal spectacle lenses comprising two parts, usually for distance vision and near vision, and to varifocal spectacle lenses, namely spectacle lenses comprising at least one progressive surface and an increasing (positive) power when the wearer of the spectacles looks down. Degressive spectacle lenses are uncommon, i.e., spectacle lenses comprising at least one progressive surface and a decreasing power (i.e., an attenuation of the power) when the wearer of the spectacles looks down.

What form must be obtained by the spectacle lens to obtain a desired optical correction is decisively determined by the material of the lens. Here, the most important parameter is the refractive index of the material. While spectacle lenses were predominantly produced from mineral glasses in the past, in particular crown glasses (Abbe number>55) and flint glasses (Abbe number<50), spectacle lenses from a multiplicity of organic materials have become available in the meantime. Such base materials for organic spectacle lenses are offered, inter alia, under the trade names CR 39, MR 8, MR 7, CR 330 and MR 174. A selection of such base materials is also found in the published specification EP 2692941 A1. Other materials are continuously being tested and developed in respect of the suitability thereof for organic spectacle lenses. Table 1, below, elucidates characteristic variables and reference variables of a selection of known base materials:

TABLE 1

Base materials for the production of spectacle lenses

| Trade name | Base material | Refractive index $n_e$ | Abbe number $v_e$ |
|---|---|---|---|
|  | Poly (methylmethacrylate) PMMA | 1.4896 | 58 |
| RAV 700 | Polyallyldiglycol carbonate PADC | 1.49 | 59 |
| CR 39 CR 330 CR 607 CR 630 | Polyallyldiglycol carbonate PADC | 1.500 | 56 |
| RAVolution | Polyurea/Polyurethane PU | 1.50 | 54 |
| Trivex | Polyurea/Polyurethane PU | 1.530 | 45 |
| Luxexcel Printoptical | Polyacrylate | 1.53 | 44 |
| SOLA Spectralite | Polyacrylate | 1.54 | 47 |
|  | Polyethylene terephthalate PET | 1.58 | 39 |
|  | Polycarbonate PC | 1.590 | 29 |
| MR 6 | Polythiourethane PTU | 1.598 |  |
| R 8 | Polythiourethane PTU | 1.598 | 41 |
| MR 7 | Polythiourethane PTU | 1.664 | 32 |
| MR 10 | Polythiourethane PTU | 1.666 | 32 |
| MR 174 | Polyepisulfide | 1.738 | 32 |
| MGC 1.76 | Polyepisulfide | 1.76 | 30 |
|  | Mineral 1.5 | 1.525 | 58 |
|  | Mineral 1.6 | 1.604 | 44 |

Currently, a large number of organic spectacle lens semifinished products or spectacle lens finished products with spherical, rotationally symmetric aspherical, or progressive front surfaces are cast in mass production in prototypes with front and back surface form shells, which are spaced apart from one another with a sealing ring, forming a cavity in the process, as described in, e.g., the documents DE 30 07 572 C2, U.S. Pat. No. 6,103,148 A, or JP 2008 191186 A. This applies to base materials with the trade names MR 7, MR 8, MR 10 and CR 39, CR 607, CR 630, etc. The base materials with the trade names MR 7, MR 8, and MR 10 are polythiourethanes marketed by Mitsui Chemicals. Here, the abbreviation "MR" stands for MITSUI RESIN. CR 39 or COLUMBIA RESIN 39 is the brand name selected by Pittsburgh Plate Glass Industries (PPG Industries) under which the material polydiethyleneglycolbisallyl carbonate or polyallyldiglycol carbonate (abbreviation: PADC) is marketed. This is a thermosetting polymer material. CR 607 and CR 630 are also produced by PPG.

Semifinished products or finished products for spectacle lenses made out of polycarbonate are generally produced in metal forms by means of an injection molding technique. This production method is described in EP 0955147 A1, for example. A semifinished product is understood to be a spectacle lens blank with a surface whose treatment has finished in accordance with Section 8.4.2 of DIN EN ISO 13666:2013-10, and whose form is no longer modified in further production steps. As a rule, the opposite surface of a semifinished product obtains its final form by a material-ablating method. A finished product is a spectacle lens blank in which both surfaces already have obtained their final form. The finished product (see Section 8.4.6 of DIN EN ISO 13666:2013-10) is defined by two optical surfaces having different spacings and possibly orientations with respect to one another depending on optical power and material (refractive index). As a consequence of the manufacturing method, with the so-called free-form manufacturing method being employed in the case of progressive spectacle lenses or high-quality single-vision spectacle lenses, the surfaces are continuous and the refractive index is homogeneous over the entire spectacle lens.

Mineral spectacle lenses are generally produced by machine-based mechanically abrasive machining of a blank.

Order-specific prescription spectacle lenses, in particular, individualized single-vision and multifocal lenses, the optical properties of which are not standardized in a preselectable manner, at least in part, are individually calculated and manufactured in a manner adapted to the user in relation to the dimensions and/or the arrangement thereof on the spectacle lens. Varifocal or progressive lenses, in particular, are brought into their final form by mechanical, in particular deforming and/or abrasive, methods. Here, the outer forms may have a round, oval, or arbitrary shape, describing so-called free-forms in the latter case.

The semifinished products or finished products described above are often subjected to one or more finishing processes. In particular, functional layers are applied to one or both sides. Such functional layers are layers that equip the spectacle lenses with predetermined properties, which are advantageous to the spectacle wearer and which the spectacle lenses would not have purely on the basis of the properties of the base or carrier material, onto which the functional layers are applied where necessary, and the forming. In addition to optical properties, such as an antireflection coating, silvering, light polarization, coloring, self-tinting etc., such advantageous properties also include mechanical properties, such as hardening, reduction of the adherence of dirt, or reduction in steaming up, etc., and/or electrical properties such as shielding from electromagnetic radiation, conduction of electrical current, etc., and/or other physical or chemical properties. Examples of functional coatings can be gathered from the documents WO 10/109154 A1, WO 01/55752 A1 and DE 10 2008 041 869 A1, for example.

It is generally known that, on account of the wavelength dependence of the refractive index of the optical material from which a spectacle lens is manufactured, the spectacle lens causes chromatic aberrations if the spectacle lens is manufactured from only one lens element. Chromatic aberrations include the longitudinal chromatic aberration, which produces different foci for different light wavelengths. The longitudinal chromatic aberration is also referred to as axial aberration. In addition to the longitudinal chromatic aberration, a transverse chromatic aberration may occur as a further chromatic aberration, the transverse chromatic aberration being expressed by way of color fringes or color edges in the image plane, on the retina of the eye in the case of a spectacle lens, which the spectacle wearer perceives and considers to be bothersome above a certain strength. The transverse chromatic aberration is also referred to as color magnification error or lateral chromatic aberration.

According to customary technical literature, for instance Diepes/Blendowske, "Optik and Technik der Brille" ["Optics and Technology of Spectacles"], Optische Fachveroffentlichung GmbH, Heidelberg, Germany, 2005, Chapter 5.3, an estimation of the width of the resulting color fringe or the transverse chromatic aberration can be specified using the formula:

$$\Delta\delta_{chrom} = \frac{\delta_e}{v_e}$$

wherein $\Delta\delta_{chrom}$ is a width of the color fringe in $$\frac{cm}{m},$$

which is proportional to a prismatic power $\delta_e$ at the examined location and to the reciprocal of the Abbe number $v_e$ of the examined material. In this case, the prismatic power and the Abbe number are related to the same wavelength, to the mercury e-line in the above formula, i.e., a wavelength of 546.074 nm.

The Abbe number $v_e$, also called Abbe's number, is a dimensionless variable for characterizing the optical dispersive properties of optical lenses, that is to say the extent to which the refractive index thereof changes with the light wavelength. The greater the dispersion (see Section 4.6 in DIN EN ISO 13666:2013-10) of the lens, the smaller the Abbe number. The Abbe number is named after the German physicist Ernst Abbe. The Abbe number $v_e$ is defined as:

$$v_e = \frac{n_e - 1}{n_{F'} - n_{C'}}$$

wherein $n_e$, $n_{F'}$ and $n_{C'}$ are the refractive indices of the material at the wavelengths of corresponding Fraunhofer lines, namely the mercury e-line at 546.07 nm, the cadmium F'-line at 479.99 nm and the cadmium C'-line at 643.85 nm (in accordance with the ISO 7944 standard) (see, Section 4.7 in DIN EN ISO 13666:2013-10).

In spectacle lenses with low power, the transverse chromatic aberration does not become apparent to the spectacle wearer in a disturbing manner. However, the chromatic aberrations, in particular the transverse chromatic aberration, increase in the case of spectacle lenses with increasing prismatic power. Furthermore, even if the ground-in prescription has no prismatic correction, spectacle lenses can nevertheless exhibit transverse chromatic aberrations on account of prismatic side effects according to Prentice's rule at large viewing angles, irrespective of whether the defective vision to be corrected is based on short-sightedness or long-sightedness.

High refractive index materials, in particular plastics or high refractive index glass types, are often used nowadays to keep the spectacle lens thickness as thin as possible for cosmetic reasons. However, it is precisely in the case of materials having a high refractive index that the transverse chromatic aberration also becomes significantly greater because increasing refractive index is generally accompanied by a lower Abbe number. In particular, the polycarbonate spectacle lenses, which are preferred owing to their resistance to breaking but have a comparatively low refractive index, also cause a disturbing color fringe for the observer owing to their comparatively low Abbe number $v_e$ of 29. Furthermore, they reduce contrast and thus impair the view of the world in comparison to people without spectacles.

In the context of the present disclosure, a "disturbing transverse chromatic aberration" is understood to mean a limit value for the transverse chromatic aberration $\Delta\delta_{chrom}$ that is perceived as disturbing by a spectacle wearer. Although this limit value is different on an individual basis, a guide value is a transverse chromatic aberration $\Delta\delta_{chrom}$ of greater than 0.25 cm/m. It is therefore desirable at least to attenuate the transverse chromatic aberration produced by a spectacle lens.

In the field of lenses, for example lenses for cameras, it is known to correct chromatic aberrations with so-called achromats. In optics, an achromat is understood to mean a system composed of at least two lens elements made of materials having different Abbe numbers and/or different refractive index and thus different dispersion behavior. Of the two lens elements, one lens element is a converging lens element, which is usually manufactured from a material having a higher Abbe number, for example crown glass, and the other lens element is a diverging lens element composed of a material having a lower Abbe number and thus greater dispersion than the converging lens element, wherein this lens element is manufactured from flint glass, for example.

The two lens elements are shaped and connected to one another at mutually complementary surfaces such that the chromatic aberration for two wavelengths is cancelled as much as possible. The two lens elements then interact in achromatic fashion. In this regard, by way of example, an achromat composed of two thin lens elements that are at a small distance from one another has the same focal length for the Fraunhofer lines F' and C' if it is the case that $$v_1 f_1 + v_2 f_2 = 0$$

wherein $v_i$ are the Abbe numbers and $f_i$ are the focal lengths of the two lens elements.

Within the meaning of the present disclosure, "interact with one another at least partly in achromatic fashion" or "interact in achromatic fashion" is understood to mean that the transverse chromatic aberration or the chromatic aberrations is or are not necessarily completely eliminated, but is or are at least attenuated. One measure of "interact with one another at least partly in achromatic fashion" or "interact in achromatic fashion" is accordingly the quotient of the transverse chromatic aberration $\Delta\delta_{chrom}$ of a spectacle lens composed of a uniform material without achromatic correction and the transverse chromatic aberration $\Delta\delta_{chrom}$ of the corresponding spectacle lens with the same dioptric power distribution with achromatic correction at the same predetermined location.

The chromatic aberration that still remains in the case of the achromat (the so-called secondary spectrum) is often manifested in a violet fringe around bright objects. To reduce the chromatic aberration even further, the refractive index at more than two wavelengths is taken into account (if the light is imaged onto a point at three wavelengths, an apochromat is obtained). Nevertheless, here as well the Abbe number helps in roughly classifying glass types.

A concise summary of the mode of operation of achromat and apochromat may be gathered from Volker Witt, "Wie funktionieren Achromat und Apochromat? Teil 1: Von der Einzellinse zum Achromaten" ["How do achromat and apochromat function? From single lens element to achromat"], Sterne und Weltraum, October 2005, pages 72 to 75, and from Volker Witt, "Wie funktionieren Achromat und Apochromat? Teil 2: Vom Achromaten zum Apochromaten" ["How do achromat and apochromat function? Part 2: from achromat to apochromat]", Sterne und Weltraum, December 2005, pages 76 to 79.

The conventional achromats described above are not suitable for use as spectacle lenses. Specifically, since the achromats are composed of two complete lens elements, they also have a corresponding thickness and, in association therewith, an excessively high weight.

The spectacle lens disclosed in the document GB 487 546 A consists of two lens elements having substantially the same refractive index. One lens element is manufactured from flint glass having a refractive index of approximately 1.61 and a reciprocal relative dispersion of approximately 36. The other lens element is manufactured from barium crown glass having a refractive index of approximately 1.61 and a reciprocal relative dispersion of approximately 50. The first-mentioned lens element is a diverging lens element, and the last-mentioned lens element is a converging lens element. The two lens elements are connected to one another at mutually complementary surfaces.

The spectacle lens thus produced has a back surface, i.e., a surface facing the wearer's eye, which is formed completely by the diverging lens element, while the front surface of the spectacle lens, i.e., the side of the spectacle lens which faces away from the wearer's eye, is formed partly by the surface of the converging lens element and, in its edge region, by the surface of the diverging lens element. The spectacle lens is thus corrected achromatically only in the central region. In comparison to the above-described achromats having whole-area achromatic correction, the spectacle lens is still relatively thick and of comparatively high weight.

The document DE 10 2010 047 846 A1 discloses a spectacle lens comprising a first and a second lens element, which interact with one another at least partly in achromatic fashion. The second lens element (at least in the non-rimmed state) is arranged in ring-shaped fashion only in an edge region of the first lens element. The spectacle lens is accordingly corrected achromatically in the edge region. Furthermore, a method for producing the spectacle lens can be gathered from the document.

DE 10 2012 102 743 A1 describes that it is important for the two lens segments forming the spectacle lens according to the document DE 10 2010 047 846 A1 to be assembled so as to form a smooth surface. The document also describes a method for designing such a spectacle lens.

In the case of the spectacle lenses described in DE 10 2010 047 846 A1 and DE 10 2012 102 743 A1, for reasons of saving weight, it is exclusively in the edge region, in which the transverse chromatic aberration is higher than in the center, that the spectacle lenses are embodied in achromatic fashion, but not over the entire spectacle lens surface. Furthermore, it is necessary to join together at least two different materials in the semifinished product, which means a not inconsiderable complexity/outlay in the optical calculation and basic lens manufacture.

Also concerned with reducing chromatic aberrations of spectacle lenses is the article by W. N. Charman entitled "Hybrid diffractive-refractive achromatic spectacle lenses," which was published in Ophthal. Physiol. Opt. 1994, Volume 14, pages 389 to 392. It is emphasized therein that achromats comprising one lens element having a low refractive index and a high Abbe number and one lens element having a high refractive index and a low Abbe number, of which one lens element is diverging and the other converging, are impracticable as spectacle lenses since they run counter to the desire for small thickness and low weight of spectacle lenses. It is proposed therein, for the purpose of overcoming the disadvantages of achromats, to combine a refractive lens element with a diffractive element, wherein the combination of the refractive lens element and the diffractive element can have substantially the same thickness and the same weight as the refractive lens element, not corrected achromatically, by itself.

However, a spectacle lens composed of a refractive lens element and a diffractive element exhibits very high complexity/outlay with regard to its production because the diffractive element has to be produced with a high precision to prevent other imaging aberrations from being induced by the diffractive element.

Another possibility for correcting chromatic aberration entails the use of a GRIN optical unit. The abbreviation GRIN stands for the expression "Gradient Refractive INdex". WO 2014/179780 A1 is concerned with such gradient refractive index lenses. According to the document, gradient refractive index lenses are cylindrical, transparent optical components having a refractive index that decreases in the radial direction. The refractive index usually decreases quadratically with the distance with respect to the center (parabolic function). A short rod composed of such a material acts like a customary converging lens, but has plane surfaces at the light entrance and light exit sides, which the document explicitly points out even in the first paragraph of the section "Background of the disclosure."

The document WO 2014/179780 A1 reveals the aim of producing a gradient refractive index lens having an Abbe number of more than 100 by doping a polymer matrix with the aid of inorganic nanocrystals. ZnS, $ZrO_2$, ZnO, BeO, AlN, $TiO_2$, and $SiO_2$ are specified as examples of suitable materials of such nanocrystals. As materials for the polymer matrix, the document specifies polyacrylate, bisphenol A novolac epoxy resin (tradename: SU-8), and polymethyl methacrylate (PMMA). The mixture of monomeric polymer and nanocrystal is deposited with the aid of a 3D printing method, and then cured with ultraviolet radiation or thermally to form the gradient refractive index lens. The chromatic aberration of such a lens can purportedly be eliminated efficiently through suitable material selection.

The patent application US 2015/0361286 A1 refers to a similar approach. The optical GRIN element described therein is formed from two nanocomposite inks in a 3D printing method. The two nanocomposite inks each comprise nanofillers distributed in a respective cured organic matrix. The optical dispersions of the two nanocomposite inks differ from one another. The distribution of the two nanocomposite inks leads to optical dispersion gradients which can purportedly correct chromatic aberrations if they are chosen suitably. The nanocomposite inks can differ from one another in the type of nanofiller, the type of organic host matrix, and the concentration of the nanofiller, or combinations thereof.

Five examples of suitable organic matrix materials are specified, namely: polyacrylate, hexanediol diacrylate (HDODA), polymethyl methacrylate (PMMA), diethylene glycol diacrylate (DEGDA), and bisphenol A novolac epoxy resin (SU-8). The nanofillers are ceramic nanoparticles which are small enough in relation to the light wavelengths that they do not scatter the light. As examples of nanofillers, the document specifies beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$), and silicon dioxide ($SiO_2$) including architectures derived therefrom.

WO 2015/102938 A1 likewise describes the production of gradient refractive index lenses with the aid of a 3D printing method. The document reveals that the 3D printing method affords in particular the possibility of locally setting the refractive index as well. The adjustability of the refractive index in all three cartesian spatial dimensions furthermore makes it possible to control numerous aberrations, including spherical and chromatic aberrations, and at the same time to fashion the lens surfaces geometrically freely. According to the disclosure of WO 2015/102938 A1, the lens can be, e.g., convex and/or concave.

US 2013/0003186 A1 describes a lens made from a continuous GRIN material. The separation of different wavelengths that is caused by an originally present dispersion of light entering a single lens is partly corrected by the optical dispersion of a continuous GRIN material forming the lens. The lens shown has a convex surface and a plane surface.

DE 10 2009 004 377 A1 describes the production of a spectacle lens with the aid of a 3D printing method. According to the disclosure of that document, one or more materials or substances can be used during the 3D printing of the spectacle lens. At least two materials can have a different color and/or transmittance and/or refractive index. A spectacle lens is disclosed whose front surface is embodied in convex fashion in a manner known per se and whose back surface is embodied in concave fashion.

US 2016/0039208 A1 describes the production of spectacle lenses with the aid of a 3D printing method. The 3D printing method makes use of a print head that can mix two printing inks in a ratio that establishes a desired specific refractive index. The printing inks can be mixed in a mixing chamber or in flight during application.

WO 2015/014381 A1 describes the production of afocal, unifocal, bifocal, trifocal or progressive spectacle lenses with the aid of a 3D printing method. According to the disclosure of the document, the spectacle lens is intended to have a high Abbe number to prevent chromatic aberrations.

US 2005/0046957 A1, from which the disclosure proceeds, describes the production of an optical element, which can also be a spectacle lens, with the aid of a micro-jet printing method. The document discloses applying polymer droplets having different refractive indexes on a substrate, where they form polymer pixels. The pixels having different refractive indices can be applied alternately and, after being applied, they can be of a size such that they can be detected by eye or a measuring instrument. An optical element having a desired refractive index profile can be produced in this way.

SUMMARY

It is an aspect of the disclosure to provide a spectacle lens in which color fringes or color edges in the image plane, on the retina of the eye in the case of a spectacle lens, which the spectacle wearer perceives and considers to be bothersome above a certain strength, are reduced. Furthermore, it is an object of the disclosure to provide a method for designing such a spectacle lens.

This object is achieved by a spectacle lens having first and second volume element groups that are arranged on grid points of two partial grids penetrating each other, and a computer-implemented method for designing such a spectacle lens.

The spectacle lens according to the disclosure comprises a first volume element group containing a plurality of first volume elements (which possibly differ in geometric shape but are identical in terms of material) and a second volume element group containing a plurality of second volume elements (which possibly differ in geometric shape but are identical in terms of material).

The first volume elements of the first volume element group are arranged as grid points of a geometric grid forming a first partial grid. The first volume elements is made of a first material with a first Abbe number $v_1$ in accordance with the definition above. In the same way, the second volume elements are arranged as grid points of a geometric grid forming a second partial grid. The second volume elements are made of a second material with a second Abbe number $v_2$. The first Abbe number $v_1$ and the second Abbe number $v_2$ differ from one another. The first material is therefore not identical with the second material.

The first volume elements and the second volume elements are arranged alternately and adjacently to one another in such a way that the first and second partial grids penetrate one another. If two partial grids of identical type are assumed, then they can be arranged in a manner displaced or offset with respect to one another, for example.

In geometry, a grid is a complete and overlap-free partition of a region of the space by a set of grid cells. The grid cells are defined by a set of (fictitious or imaginary) grid points which are interconnected by a set of (fictitious or imaginary) grid lines.

The first and the second partial grid penetrating one another means that the first partial grid and the second partial grid together have a space in common without coinciding in their entireties. Within the scope of the present disclosure, penetrate one another means an arrangement in the style of a zinc blende structure, for example, which can be described as a combination of two cubic face-centered partial lattices placed within one another, which are arranged displaced by ¼ of the space diagonal in relation to one another. The intention is also to encompass layer lattices, which are displaced in relation to one another by a certain dimension of a vector lying in the layer surface. The two first and second partial grids need not necessarily be of identical shape either. It is also not necessary for respectively one of the first volume elements to be arranged directly adjacent to one of the second volume elements. A filling and/or support matrix can also be present, for example, which encloses the respective first and second volume elements.

The transition between a first volume element and a second volume element can also take place abruptly by an abrupt change in the material of the adjacent first and second volume elements.

Alternatively, the transition between a first volume element and a second volume element can also take place progressively or gradually. This can correspondingly take place by a gradual change in the material of the adjacent volume elements.

The first and second volume elements with their different Abbe numbers $v_1$ and $v_2$, on account of their arrangement with respect to one another, according to the disclosure, interact at least partly in achromatic fashion. The transverse chromatic aberration is at least attenuated. The form of the individual first and second volume elements and the arrangement thereof with respect to one another are chosen such that the quotient of the transverse chromatic aberration $\Delta\delta_{chrom}$ of a spectacle lens manufactured exclusively from the first material (that is to say without achromatic correction) and the transverse chromatic aberration $\Delta\delta_{chrom}$ of the corresponding spectacle lens configured according to the disclosure (that is to say having the partial grids formed from first and second volume elements and penetrating one another) with the same dioptric power distribution, at the same predetermined location on the spectacle lens, is greater than 1. Typically, the quotient is greater than 2 and even more typically greater than 3. The measurement is ideally carried out at points, alternatively with the measurement spot size of a refractometer, such as an Abbe refractometer (see, for example, www.kruess.com/labor/produkte/refraktometer/abbe-refraktometer/) or in the ZEISS/Abbe refractometer model A available in the Applicant's laboratory. Measurement is carried out under standard conditions, namely 20° C., at the wavelengths $\lambda_e$, $\lambda_C$, and $\lambda_{F'}$. Typically, the direction of the light beams for which the achromatism condition holds true is that which is oriented directly from the front, parallel to the visual axis in the case of free viewing forward toward the spectacle lens. The design is typically implemented with $\lambda_{F'}$ and $\lambda_{C'}$ as reference wave numbers, wherein $\lambda_F$=479.9914 nm and =643.8469 nm are those for a cadmium light source.

In principle, the disclosure maintains the principle of the achromat (or apochromat) which is described, e.g., in Volker Witt, "Wie funktionieren Achromat und Apochromat? Part 1: Von der Einzellinse zum Achromaten," Sterne und Weltraum, October 2005, pages 72 to 75, and Volker Witt, "Wie funktionieren Achromat und Apochromat? Part 2: Vom Achromaten zum Apochromaten," Sterne und Weltraum, December 2005, pages 76 to 79, for the case of optical lenses (note: the same principle also applies, however, to optical prisms). The front surface of the spectacle lens, that is to say in accordance with DIN EN ISO 13666:2013, Section 5.8, that surface of a spectacle lens which as intended in the spectacles faces away from the eye, and the opposite back surface (DIN EN ISO 13666:2013, Section 5.9) are furthermore embodied in an inherently conventional manner. Accordingly, the front surface is generally (that is to say apart from locally delimited deviations) a convexly curved surface and the back surface is (likewise apart from locally delimited deviations that possibly exist) concavely curved. According to the disclosure, the first and second volume elements arranged in succession along the light path from the object observed by the spectacle wearer through the spectacle lens into the eye of the spectacle wearer interact in such a way that the achromatism condition, according to which the color-dispersing powers of the individual first and second volume elements lying in the light path cancel one another out without the deflection itself being cancelled, is approximately satisfied.

The achromatism condition can be satisfied by the first and second volume elements being embodied in the form of (small) prism elements or (small) lens elements, for example. To put it another way: Through suitable combination of a plurality of dispersive optical volume elements (e.g., two or more prisms or two or more lens elements of different materials), the color dispersion of the first volume element can be cancelled out again by that of the second volume element, without the deflection itself being cancelled.

The problem of the color fringes is solved by the design of an achromat. The manifestation of the color fringes is dependent on the dispersion of the individual materials. With suitable selection of the materials, the total sum of the chromatic aberrations of the spectacle lens can be minimized, ideally eliminated.

It has proven to be advantageous if the first Abbe number $v_1$ is less than 40 and the second Abbe number $v_2$ is greater than 40. This condition can be realized using commercially available plastics materials, as can be gathered from Table 1 indicated above. The greater the separation between the Abbe numbers, the smaller the difference in power between the lenses can be; typical representations of optical lens and polymer lens with high refractive index and low Abbe number have values of $v_e$=20 to 30 and low refractive index equivalents have values of $v_e>50$, such that $v_e=40$ corresponds approximately to the neutral mean value. The maximum efficiency is achieved with a maximum Abbe number difference, wherein here the prismatic power has a counteracting effect as a result of the optical power of the lenses; that is to say that as the difference between the Abbe numbers increases, with the performance of the achromat remaining the same, it is possible to choose a lower optical power (and hence prismatic power), which has an advantageous effect on the size and weight of the lens system.

The first material has a first refractive index $n_1$ and the second material has a second refractive index $n_2$. The inventors have furthermore established that the achromatism condition, according to which the color-dispersing powers of the individual first and second volume elements lying in the light path cancel one another out, without the deflection itself being cancelled, can be realized if the first refractive index $n_1$ is greater than the second refractive index $n_2$. Consequently, according to the disclosure, a miniaturization and multiplication of the macroscopic principle described above for the case of lens elements interacting in achromatic fashion takes place (see Volker Witt, loc. cit.).

According to the current understanding, the range of different refractive indexes available is significantly smaller with the use of plastics materials ($1.48<n_e<1.76$) than with the use of mineral glasses ($1.5<n_e<1.9$). This is owing to the fact that very stringent requirements are made of the optical quality of the plastics in conjunction with low price for use for producing refractive spectacle lenses, i.e., spectacle lenses based on light refraction, to which the present disclosure is geared, in particular. Therefore, in one exemplary embodiment, the inventors propose as the second material, of which the second volume elements of the second volume element group are made of, a material from the group of poly(methylmethacrylate) (PMMA), polyallyldiglycol carbonate (PADC), polyurethane (PU), and polyacrylate. Alternatively or additionally, the inventors propose that the first material, of which the first volume elements of the first volume element group are made of, is a material from the group of polyethylene terephthalate (PET), polycarbonate (PC), polythiourethane (PTU), and polyepisulfide.

As was explained in the introductory part of the description, it is known to alter the refractive indeces of transparent materials by adding nanoparticles to a polymer matrix, provided that the nanoparticles are sufficiently small and thus do not have a disturbing light-scattering effect. In this respect, reference is made in particular to the documents WO 2014/179780 A1 and US 2015/0361286 A1 cited above.

Based on the above, the inventors propose choosing the first material from the group of the following materials: poly(methylmethacrylate) (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA), and bisphenol A novolac epoxy resin (SU-8). The first material can be present in pure form or it can contain a first addition of a first concentration—different than zero—of nanoparticles from the group of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$), and silicon dioxide ($SiO_2$). If the first material is present in pure form, the concentration of the addition is zero. The formulation of first addition of a first concentration of nanoparticles is intended to encompass both cases, that is to say a concentration of zero and a concentration different than zero.

In a corresponding manner, the second material can be a material from the group of poly(methylmethacrylate) (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA), and bisphenol A novolac epoxy resin (SU-8), and have a second addition of a second concentration of nanoparticles from the group of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$), and silicon dioxide ($SiO_2$). The formulation of second addition of a second concentration of nanoparticles is in turn intended to encompass both cases, that is to say a concentration of zero and a concentration different than zero.

The above-described power of the spectacle lens according to the disclosure can be obtained with first volume elements that each have a volume of between 1000 $\mu m^3$ and 1 $mm^3$ and/or with second volume elements that each have a volume of between 1000 $\mu m^3$ and 1 $mm^3$. The smallest possible volume of a volume element is predetermined by the production method, for example, by the droplet size in the case of so-called multijet or polyjet modelling and, for example, by the focus dimension of the laser in a stereolithography method. Details concerning the manufacturing methods are described in sections below.

The number of first volume elements, which form the first part, typically lies between 50 and $10^9$, more typically between 100 and $10^8$, even more typically between 200 and $10^7$ and particularly typically between 500 and $10^6$.

The number of second volume elements, which form the second part, typically lies between 50 and $10^9$, more typically between 100 and $10^8$, even more typically between 200 and $10^7$ and particularly typically between 500 and $10^6$.

Typically, the number of first volume elements and number of second volume elements are of the same order of magnitude. This means that the number of the first volume elements and the number of the second volume elements deviate from one another by not more than a factor of 10, typically not more than a factor of 8, more typically not more than a factor of 5, and even more typically not more than a factor of 2.

As has already been explained above, it is possible the achromatism condition which along the light path from the object observed by the spectacle wearer through the spectacle lens into the eye of the spectacle wearer is intended to be at least approximately satisfied according to one exemplary embodiment of the disclosure if the first and second volume elements arranged in succession along the light path interact in such a way that the color-dispersing powers of the individual first and second volume elements lying in the light path substantially cancel one another out, without the deflection itself being cancelled. The achromatism condition can be satisfied, e.g., by the first and second volume elements being embodied in the form of (micro-) prism elements or (micro-) lens elements. To put it another way: Through suitable combination of a plurality of dispersive optical volume elements (e.g., two or more prisms or two or more lens elements of different materials), the color dispersion of the first volume element (or of the plurality of first volume elements) can be cancelled out again by that of the second volume element (or of the plurality of second volume elements), without the deflection itself being cancelled.

Specifically, this can be achieved, e.g., if the first partial grid of the spectacle lens according to the disclosure, the spectacle lens having a front surface and a back surface, is a three-dimensional grid and the first volume elements each have an at least approximately prismatic form with a respectively assigned prism base. The second partial grid is likewise a three-dimensional grid and, in a similar manner, the second volume elements each have an at least approximately prismatic form with a respectively assigned prism base. If it is assumed that a plurality of the first and second volume elements are in each case arranged in succession along the shortest imagined linear line extending from the back surface to the front surface and the plurality of successively arranged ones of the first and second volume elements are in each case arranged alternately, namely one of the first volume elements is in each case arranged adjacent to one of the second volume elements, which in turn is arranged adjacent to one of the first volume elements, etc., then in this variant the disclosure provides that in this arrangement in succession the respective prism base of one of the first volume elements is arranged counter to the respective prism base in relation to one of the respectively adjacent ones of the second volume elements.

In an exemplary embodiment of the disclosure, the spectacle lens comprises a carrier having a surface and the first volume element group and the second volume element group are arranged on the surface of the carrier. This is advantageous particularly if the first and second volume elements are produced with the aid of a 3D printing method.

The carrier can have an object-side spherical or toric or free-form surface and the surface on which the first volume element group and the second volume element group are arranged can be the eye-side surface of the carrier.

Alternatively, the carrier can also have an eye-side spherical or toric or free-form surface and the surface on which the first volume element group and the second volume element group are arranged can be the object-side surface of the carrier. In both of the above-described variants, the overall effect of the spectacle lens is composed of the refractive power of the spherical or toric or rotationally symmetrical aspherical or free-form surface and the light-refractive properties of the volume elements of the first and the second volume element groups.

Finally, it is also possible that the surface on which the first volume element group and the second volume element group are arranged is/are the eye-side and/or the object-side surface of the carrier. Then, the overall effect of the spectacle lens is substantially composed of the light-refractive properties of the volume elements of the first and the second volume element groups.

Additionally, a coat can be arranged on the first volume element group and the second volume element group. In particular, all functional layer structures mentioned in the introductory part of the description can be provided as coats. In particular, mention should be made of those coats that influence or change optical properties, such as an antireflection coating, silvering, light polarization, coloring, self-tinting etc., and mechanical properties, such as hardening, reduction of the adherence of dirt, or reduction in steaming up, etc., and/or electrical properties such as shielding from electromagnetic radiation, conduction of electrical current, etc., and/or other physical or chemical properties of the spectacle lens.

Finally, it is possible that the first volume element group and the second volume element group are embodied as buried structures. On the one hand, this substantially simplifies a subsequent hard or antireflection coating (e.g., conventional smoothing hard coat systems can be used) and, on the other hand, discontinuities or bends or jumps in the surfaces of the volume elements adjoining one another do not form cavities for the subsequent collection of dirt on the surface of the completed spectacle lens. Buried structures are understood to mean embedding in a substrate material.

In principle, any manufacturing method for producing the spectacle lenses described above is suitable which allows the control of the refractive indices for each individual volume element or voxel. A three-dimensional structure in which the material is varied in spatial distribution is constructed by means of the manufacturing method. In the viewing direction, those surfaces of the volume elements which face the object side or the eye side can be shaped in any desired manner, for example, but not exhaustively, in the shape of a square, rectangle, rhombus, hexagon, or circle.

A method according to the disclosure for producing a spectacle lens, in particular of the various exemplary embodiments described above, comprises the steps of:

additive manufacturing of a first volume element group, wherein the first volume element group comprises a plurality of first volume elements, wherein the plurality of first volume elements is arranged in the style of grid points of a geometric grid so as to form a first partial grid, wherein the first volume elements are made of a first material with a first Abbe number $v_1$, and additive manufacturing of a second volume element group, wherein the second volume element group comprises a plurality of second volume elements, wherein the plurality of second volume elements is arranged in the style of grid points of a geometric grid so as to form a second partial grid, wherein the second volume elements are made of a second material with a second Abbe number $v_2$, wherein the first Abbe number $v_1$ and the second Abbe number $v_2$ differ from one another, and wherein the first partial grid and the second partial grid are arranged penetrating one another during the additive manufacturing.

Additive manufacturing: (AM), is a comprehensive label for the methods, previously often referred to as rapid prototyping, for fast and cost-effective manufacture of models, patterns, prototypes, tools, and end products. This manufacture is implemented directly on the basis of computer-internal data models from formless (liquids, powder and the like) or form-neutral (band-shaped, wire-shaped) material by means of chemical and/or physical processes. Although these are primary forming methods, no special tools that have stored the respective geometry of the workpiece (for example molds) are required for a specific product. The related art is conveyed by the VDI Statusreport AM 2014. An overview of current 3D printing methods is provided by 3druck.com/grundkurs-3d-drucker/teil-2-uebersicht-der-aktuellen-3d-druckverfahren-462146/, retrieved on Jul. 13, 2016.

The object stated in the introduction is achieved in its entirety with such a method according to the disclosure for producing a spectacle lens.

The method of multijet modelling or polyjet printing has been found to be particularly suitable. This method is described, for example, at the URL de.wikipedia.org/wiki/Multi_Jet_Modeling, the URL www.materialise.com/en/manufacturing/3d-printing-technology/polyjet or the URL www.stratasys.com/polyjet-technology, respectively last retrieved on Apr. 12, 2019. Polyjet is a powerful 3D printing technology, by means of which smooth, precise components, prototypes, and production aids can be produced. Thanks to microscopic layer resolution and an accuracy of up to 0.1 mm, thin walls and complex geometries can be produced thereby from the most comprehensive spectrum of materials available for each technology. The polyjet 3D printer has a similar operation to that of an inkjet printer. However, instead of spraying ink droplets onto paper, polyjet 3D printers spray layers made of a crosslinkable, liquid photopolymer onto a construction platform. The method is comparatively simple: In a first preparation step, the preparation software automatically calculates the placement of the photopolymer and of the support material (i.e., a material that only serves during the 3D printing for positioning and supporting the photopolymer until the latter is cured) on the basis of a 3D CAD file. During the actual production, the 3D printer sprays tiny droplets of liquid photopolymer and immediately crosslinks these by means of UV light. Thus, fine layers accumulate on the construction platform, one or more precise 3D models or 3D parts arising therefrom. If overhanging or complex forms have to be supported, the 3D printer sprays a removable support material. The user can easily remove the support material by hand, with water or in a solvent bath. The models and components can typically be processed and used directly from the 3D printer, without having to post-harden.

The Stratasys (Objet) Eden 260 V 3D printer, in particular, is suitable for the application according to the disclosure. The materials referred to above in the introductory part of the description and, in particular, specified in documents WO 2014/179780 A1 and WO 2015/014381 A1 are suitable for use in the method according to the disclosure. In this regard, by way of example, suitable polymers for the first and second volume elements are polyolefins such as, cycloolefin polymers, polyacrylates, e.g., polymethyl (meth)acrylates, poly(meth)acrylates, polyethyl (meth)acrylates, polybutyl (meth)acrylates, and polyisobutyl (meth)acrylates, polyesters, polyamides, polysiloxanes, polyimides, polyurethanes, polythiourethanes, polycarbonates, polyallyls, polysulfides, polyvinyls, polyarylenes, polyoxides, and polysulfones, or mixtures thereof. Appropriate monomers or prepolymers suitable as printing material for producing the first and second volume elements are olefins, acryls, epoxides, organic acids, carboxylic acids, styrenes, isocyanates, alcohols, norbornenes, thiols, amines, amides, anhydrides, allyls, silicones, vinyl esters, vinyl ethers, vinyl halides, and episulfides. The monomers or prepolymers can be curable thermally or in a radiation-induced manner (in particular by means of UV radiation). Photoinitiators and, if appropriate, co-photoinitiators can be used for radiation-induced curing.

With the use of a 3D printer which can process thermoplastics droplet by droplet or more generally with control of individual volume elements or voxels, the following two combinations are appropriate: PMMA (low refractive index material for second volume elements) and PC (high refractive index material for first volume elements); and PMMA (low refractive index material for second volume elements) and PET (high refractive index material for first volume elements).

With the use of a 3D printer which can process monomers of thermosetting plastics droplet by droplet or more generally with control of individual voxels with (typically directly) subsequent curing, the following combinations, inter alia, are appropriate: ADC (low refractive index material for second volume elements) and episulfide (MR-174) (high refractive index material for first volume elements); and PU (low refractive index material for second volume elements) and PTU (MR-7) (high refractive index material for first volume elements).

As described above, the first and second volume elements can also include an organic matrix to which nanoparticles have been added. The organic matrix can be made of, e.g., di(ethylene glycol)diacrylate, neopentyl glycol diacrylate, hexanediol diacrylate, bisphenol A novolac epoxy resin (SU8), 2-hydroxyethyl methacrylate (HEMA), polyacrylate, poly(meth)acrylate, polymethyl (meth)acrylate (PMMA), styrene, and poly[(2,3,4,4,5,5-hexafluorotetrahydrofuran-2,3-diyl)(1,1,2,2-tetrafluoroethylene)] (CYTOP). Possible materials for the nanoparticles are $ZnS$, $ZrO_2$, $ZnO$, $BeO$, $AlN$, $TiO_2$, and $SiO_2$, for example.

The spectacle lens according to the disclosure need not necessarily be present in substantive form. Rather, a virtual model of the spectacle lens is sufficient, which is stored on an (in particular nonvolatile) data carrier (this is taken to mean any suitable computer storage medium) in the form of a representative (e.g., as a data structure; e.g., as a 3D CAD file in the case of the additive method described above).

To generate such a virtual model which can then form the basis for manufacturing data for producing a substantive spectacle lens, a computer-implemented method for designing a spectacle lens is needed. The computer-implemented method according to the disclosure for designing a spectacle lens comprises the steps of:

providing a virtual representation of a first volume element group, wherein the first volume element group comprises a plurality of first volume elements, wherein the plurality of first volume elements is arranged as grid points of a geometric grid forming a first partial grid, and wherein the first volume elements consist of a first material with a first Abbe number ($v_1$), providing a virtual representation of a second volume element group, wherein the second volume element group comprises a plurality of second volume elements, wherein the plurality of second volume elements is arranged as grid points of a geometric grid forming a second partial grid, wherein the second volume elements is made of a second material with a second Abbe number ($v_2$), wherein the first Abbe number ($v_1$) and the second Abbe number ($v_2$) differ from one another, and the first partial grid and the second partial grid are arranged penetrating one another.

The object stated in the introduction is achieved in its entirety by means of such a computer-implemented method according to the disclosure for designing a spectacle lens.

In one exemplary embodiment of the above-described producing or designing methods according to the disclosure, the first and second volume elements can be arranged in such a way that, along a predetermined light path through the spectacle lens, they interact at least partly in achromatic fashion.

By way of example, those of the first and second volume elements which can be arranged in succession along a predetermined light path through the spectacle lens can be embodied as prism elements or as lens elements. To put it another way, a plurality of dispersive optical first and second volume elements embodied as prism elements or as lens elements are arranged with respect to one another in the light path such that the color dispersion of the first volume element (or of the plurality of first volume elements) is cancelled out again by that of the second volume element (or of the plurality of second volume elements), without the deflection itself being cancelled.

Part of the disclosure is also a computer program having program code for carrying out all method steps of the abovementioned method for designing a spectacle lens when the computer program is loaded in a computer in particular in the form of a compiled code and/or is executed in a computer in particular in the form of an interpreted code.

It has already been explained above that the spectacle lens can comprise a carrier, on which the first and second volume element groups are arranged. One particularly advantageous configuration of the producing method according to the disclosure includes providing a carrier having a surface and applying the first volume element group and the second volume element group on the surface of the carrier. This is advantageous particularly if the first and second volume elements are produced with the aid of a 3D printing method.

The carrier can have an object-side spherical or toric or free-form surface and the surface on which the first volume element group and the second volume element group are applied can be the eye-side surface of the carrier. Alternatively, the carrier can also have an eye-side spherical or toric or free-form surface and the surface on which the first volume element group and the second volume element group are applied can be the object-side surface of the carrier. In both of the above-described variants, the overall effect of the spectacle lens is composed of the refractive power of the spherical or toric or rotationally symmetrical aspherical or free-form surface and the light-refractive properties of the volume elements of the first and the second volume element groups.

Finally, it is also possible that the surface on which the first volume element group and the second volume element group are applied is/are the eye-side and/or the object-side surface of the carrier. Then, the overall effect of the spectacle lens is substantially composed of the light-refractive properties of the volume elements of the first and the second volume element groups.

One exemplary embodiment of the disclosure comprises additively manufacturing the carrier having the surface and then additively applying the first volume element group and the second volume element group thereon.

BRIEF DESCRIPTION OF THE DRAWINGS

The disclosure will now be described with reference to the drawings, wherein.

DESCRIPTION OF EXEMPLARY EMBODIMENTS

Explanations were given above that the spectacle lens according to the disclosure comprises at least two volume element groups. The two volume element groups, referred to as first and second volume element groups below, each comprise a plurality of corresponding volume elements. The volume elements of the first volume element group are referred to as first volume elements below; the volume elements of the second volume element group are referred to as second volume elements below.

The first volume elements are arranged as grid points of a geometric grid and form a first partial grid. The first volume elements are made of a first material with a first Abbe number $v_1$. The second volume elements are likewise arranged as grid points of a geometric grid and together form a second partial grid in their own right. The second volume elements are made of a second material with a second Abbe number $v_2$, which is different than the first Abbe number $v_1$.

The first partial grid and the second partial grid are arranged displaced within one another in penetrative fashion in each case. As a result, the regions of the spectacle lens that are defined by the two partial grids respectively formed from different volume elements geometrically coincide on a macroscopic level. This will be elucidated once again below with reference to the figures.

Figure 1:
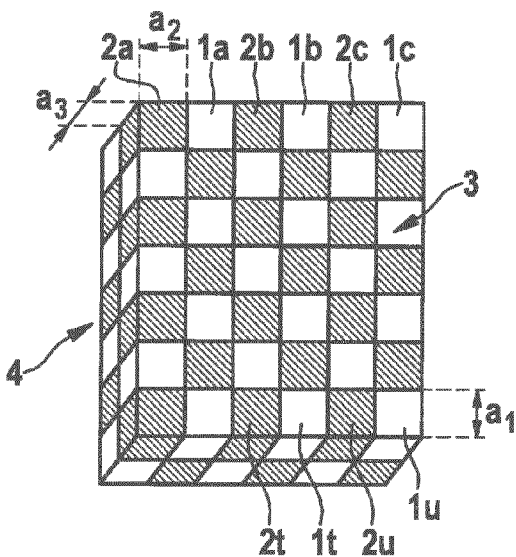
FIG. 1 shows a first exemplary embodiment for the arrangement of two partial grids formed by volume elements of first and second volume element groups, displaced within one another in penetrative fashion.

FIG. 1 shows a first exemplary embodiment for the arrangement of two partial grids formed by volume elements of first and second volume element groups, displaced within one another in penetrative fashion. The first partial grid includes volume elements $1a$, $1b$, $1c$ . . . $1t$, $1u$, which are depicted as parallelepipedal in the present exemplary embodiment and which are arranged like the white fields of two checkerboards arranged one above the other. The second partial grid includes volume elements $2a$, $2b$, $2c$ . . . $2t$, $2u$, which are depicted as parallelepipedal in the present exemplary embodiment and which are arranged like the black fields of two checkerboards arranged one above the other. The colors of the fields of the lower checkerboard are interchanged relative to the colors of the upper checkerboard.

In this exemplary embodiment, each volume element $1a$, $1b$, $1c$ . . . $1t$, $1u$, $2a$, $2b$, $2c$ . . . $2t$, $2u$ takes up the same rectangular volume having edge lengths $a_1$, $a_2$, $a_3$. The edge lengths $a_1$, $a_2$, $a_3$ typically lie in the range between 10 μm and 1 mm. The volumes of the parallelepipedal volume elements $1a$, $1b$, $1c$ . . . $1t$, $1u$, $2a$, $2b$, $2c$ . . . $2t$, $2u$ are then in the range between 1000 μm$^3$ and 1 mm$^3$.

In the present exemplary embodiment, the first partial grid that is based on the volume elements $1a, 1b, 1c \ldots 1t, 1u$ and the second partial grid that is based on the volume elements $2a, 2b, 2c \ldots 2t, 2u$ have an identical exemplary embodiment. From a geometric point of view, the two partial grids are offset in relation to one another by the edge length $a_1$ in the direction of a sheet row. Alternatively, it is also possible that the two partial grids are offset in relation to one another by the edge length $a_2$ in a direction perpendicular to the direction of a sheet row. In this exemplary embodiment, both partial grids lie in one plane. In the present case, let the surface 3 visible in FIG. 1 be the surface facing the object in the case of an intended use of the spectacle lens, which is based on the structure shown in FIG. 1. Accordingly, the surface 4 that is not visible in FIG. 1 in that case is the surface facing the eye of the spectacle wearer in the case of an intended use of the spectacle lens. The object-side surface of a single volume element $1a, 1b, 1c \ldots 1t, 1u, 2a, 2b, 2c \ldots 2t, 2u$, which in each case represents a plane surface in the present schematic exemplary embodiment, lies between 100 µm² and 1 mm², taking account of the aforementioned size specifications.

From a macroscopic standpoint, the surface region defined by the first partial grid and the surface region defined by the second partial grid coincide, such that no macroscopic separation exists.

By way of example, WO 2015/102938 A1 describes in detail how such grid structures can be produced. Thus, a 3D printer equipped with one or more processors receives a CAD model with data of, in the present exemplary embodiment, two layers, each by themselves comprising a multiplicity of volume elements. Thus, the data contain, for example, the information that the first volume elements $1a, 1b, 1c \ldots 1t, 1u$, specified above, are intended to be manufactured from a first material with a first Abbe number $v_1$, corresponding to a first printing ink, and the information that the second volume elements $2a, 2b, 2c \ldots 2t, 2u$, specified above, should be manufactured from a second material with a second Abbe number $v_2$, corresponding to a second printing ink. From the data, the processor or processors of the 3D printer calculate the respective location at which the respective printing ink is intended to be placed, the temperature and/or the UV light requirements and the corresponding times to cure the placed printing ink for the purposes of generating the respective volume element $1a, 1b, 1c \ldots 1t, 1u, 2a, 2b, 2c \ldots 2t, 2u$. In the present exemplary embodiment, the first material shall be PC, and the second material PMMA. The two substances mentioned are thermoplastics, the curing of which does not require UV light.

Figure 2:
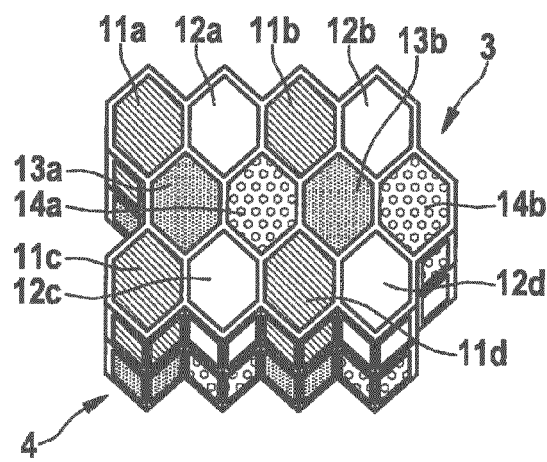
FIG. 2 shows an exemplary embodiment for the arrangement of four partial grids formed by volume elements of first, second, third, and fourth volume element groups, displaced within one another in penetrative fashion.

FIG. 2 shows a further exemplary embodiment of an arrangement of volume elements of partial grids, displaced within one another in penetrative fashion. In this exemplary embodiment, the overall grid is formed from four partial grids. The four partial grids comprise volume elements of first, second, third, and fourth volume element groups. The first partial grid, which is based on the hexagonal volume elements $11a, 11b, 11c, 11d$, the second partial grid, which is based on the hexagonal volume elements $12a, 12b, 12c, 12d$, the third partial grid, which is based on the hexagonal volume elements $13a, 13b$, and the fourth partial grid, which is based on the hexagonal volume elements $14a, 14b$, have an identical embodiment in the present exemplary embodiment. The volumes of the hexagonal volume elements $11a, 11b, 11c, 11d, 12a, 12b, 12c, 12d, 13a, 13b, 14a, 14b$ are in the range of between 1000 µm³ and 1 mm³. In the present case, let the surface 3 visible in FIG. 2 be the surface facing the object in the case of an intended use of the spectacle lens, which is based on the structure shown in FIG. 2. Accordingly, the surface 4 that is not visible in FIG. 2 in that case is the surface facing the eye of the spectacle wearer in the case of an intended use of the spectacle lens. In the present exemplary embodiment, the first material shall be PET, the second material PMMA, the third material PC, and the fourth material PU.

From a macroscopic standpoint, the surface region defined by the first partial grid, the surface region defined by the second partial grid, the surface region defined by the third partial grid and the surface region defined by the fourth partial grid coincide, such that no macroscopic separation exists.

Figure 3:
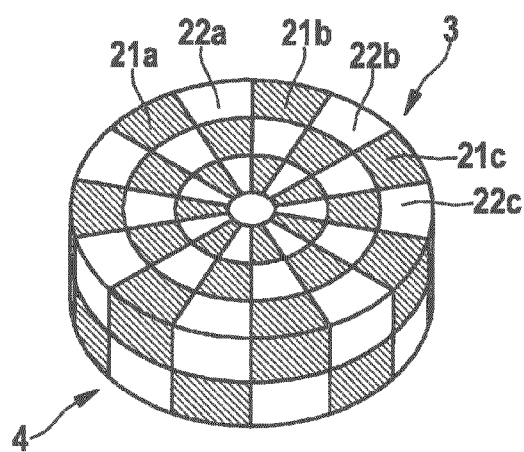
FIG. 3 shows a second exemplary embodiment for the arrangement of two partial grids formed by volume elements of first and second volume element groups, displaced within one another in penetrative fashion.

FIG. 3 shows a second exemplary embodiment for the arrangement of two partial grids formed by volume elements of first and second volume element groups, displaced within one another in penetrative fashion. The first partial grid is based on the ring-segment-shaped volume elements $21a, 21b, 21c, \ldots$, which are depicted with hatching in FIG. 3. The second partial grid comprises a plurality of ring-segment-shaped volume elements $22a, 22b, 22c, \ldots$, which are depicted white in FIG. 3.

Figure 4:
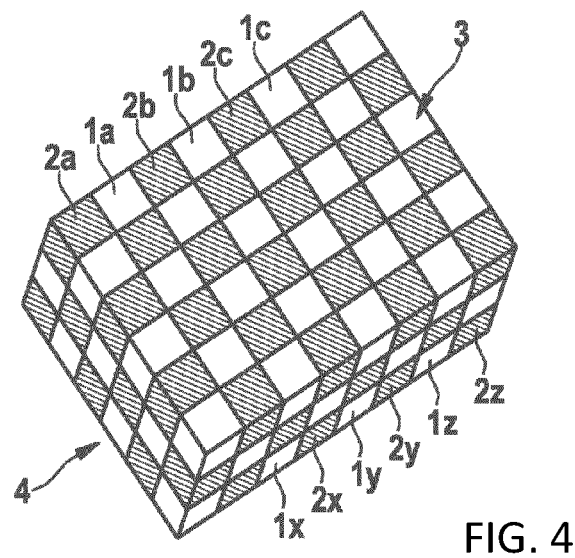
FIG. 4 shows a third exemplary embodiment for the arrangement of two partial grids formed by volume elements of first and second volume element groups, displaced within one another in penetrative fashion.

FIG. 4 shows a third exemplary embodiment for the arrangement of two partial grids formed by volume elements of first and second volume element groups, displaced within one another in penetrative fashion.

In the present exemplary embodiment, the first partial grid that is based on the volume elements $1a, 1b, 1c \ldots 1x, 1y, 1z$ and the second partial grid that is based on the volume elements $2a, 2b, 2c \ldots 2x, 2y, 2z$ have an identical embodiment. Both partial grids represent a sequence of three-dimensional structures illustrated as cubic, the respective volume elements $1a, 1b, 1c \ldots 1x, 1y, 1z, 2a, 2b, 2c \ldots 2x, 2y, 2z$ of which are arranged adjacently and in a manner interleaved in one another. Accordingly, the final grid comprises three layers of the type described with reference to FIG. 1. In the present case, let the surface 3 visible in FIG. 4 be the surface facing the object in the case of an intended use of the spectacle lens, which is based on the structure shown in FIG. 4. Accordingly, the surface 4 that is not visible in FIG. 4 in that case is the surface facing the eye of the spectacle wearer in the case of an intended use of the spectacle lens.

Figure 5A:
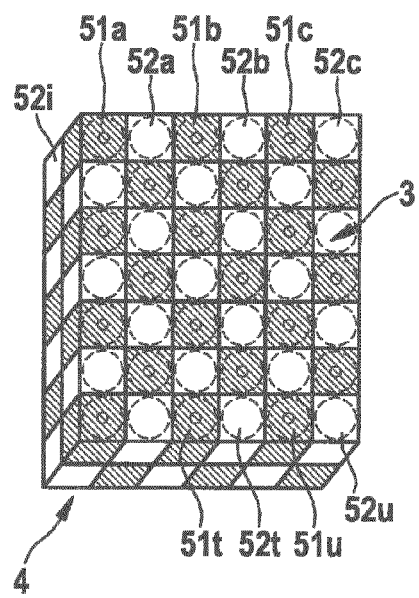
FIG. 5 shows a fourth exemplary embodiment for the arrangement of two partial grids formed by volume elements of first and second volume element groups, displaced within one another in penetrative fashion, including:
a) arrangement of the volume elements,
b) enlarged illustration of in each case one of the first and second volume elements (first alternative), and
c) enlarged illustration of in each case one of the first and second volume elements (second alternative).
Figure 5B:
Figure 5C:
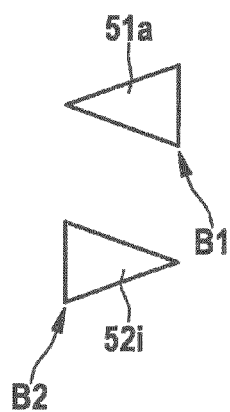

FIGS. 5A to 5C show a fourth exemplary embodiment for the arrangement of two partial grids formed by volume elements of first and second volume element groups, displaced within one another in penetrative fashion. FIG. 5A shows the basic arrangement of the volume elements $51a, 51b, \ldots 51t, 51u, 52a, 52b, 52c, \ldots 52t, 52u$ in the style of a three-dimensional two-layered checkerboard pattern, as described in detail above in relation to FIG. 1. In the present case, let the surface 3 visible in FIG. 5A be the surface facing the object in the case of an intended use of the spectacle lens, which is based on the structure shown in FIG. 5A. Accordingly, the surface 4 that is not visible in FIG. 5A in that case is the surface facing the eye of the spectacle wearer in the case of an intended use of the spectacle lens. It shall furthermore be assumed that the surface 3 shows a segment of the actual front surface of the spectacle lens and the surface 4 represents the corresponding opposite segment of the actual back surface of the spectacle lens.

A light ray coming from an object will for example enter the spectacle lens on the surface of the first volume element $51a$ facing the object, pass through the volume element $51a$, emerge again at the rear side thereof, in this case enter the volume element $52i$ through the front surface thereof, pass through the volume element and emerge at the rear side thereof in order to leave the spectacle lens again on the rear side and from there enter the eye of the spectacle wearer. According to the disclosure, the two volume elements 51*a* and 52*i* are intended to be able to interact in achromatic fashion. FIGS. 5B and 5C show two advantageous configurations for the volume elements 51*a* and 52*i* for achieving this purpose.

It has been explained above that for an achromatic (or, if appropriate, apochromatic) interaction, for example, a plurality of dispersive optical first and second volume elements, the form of which is coordinated with one another, can be arranged in succession in the light path in such a way that the color dispersion of the first volume element (or of the plurality of first volume elements) is cancelled out again by that of the second volume element (or of the plurality of second volume elements), without the deflection itself being cancelled. By way of example, it is indicated that they can be embodied as prism elements or as lens elements.

FIG. 5B shows the configuration of the volume elements 51*a* and 52*i* in the form of lens elements. The first volume element 51*a* is embodied as a micro-convex lens element according to this exemplary embodiment and the second volume element 52*i* is embodied as a micro-concave lens element according to this exemplary embodiment. The focal lengths and Abbe numbers of the two lens elements 51*a*, 52*i* must ideally be coordinated with one another such that the achromatism condition (e.g., in accordance with the approximation formula above) is satisfied in the best possible way.

FIG. 5C shows the configuration of the volume elements 51*a* and 52*i* in the form of prism elements. The first volume element 51*a* is embodied as a prism element having the base position B1 according to this exemplary embodiment and the second volume element 52*i* is embodied as a prism element having the base position B2 according to this exemplary embodiment. The base positions and prism powers of the two prism elements 51*a*, 52*i* must ideally be coordinated with one another such that the achromatism condition is satisfied in the best possible way. The base positions B1, B2 of the two prism elements 51*a*, 52*i* are arranged opposite one another.

Figure 6:
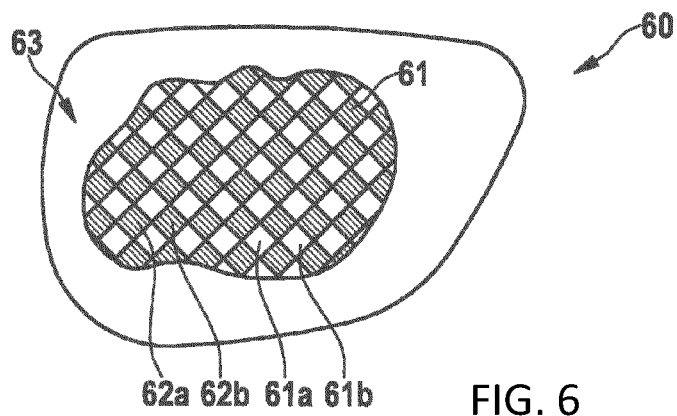
FIG. 6 shows a first exemplary embodiment of a spectacle lens according to the disclosure in a plan view from the object side (schematic sketch).

FIG. 6 shows a first exemplary embodiment of a spectacle lens 60 in a plan view from the object side in the form of a schematic sketch. The visible surface is denoted by the reference sign 63. The exemplary embodiment has a region 61, which is embodied in the form according to the disclosure. It is possible to see an interleaved arrangement of two partial grids in the style of a "checkerboard pattern," as shown in FIGS. 1 and 5A. Volume elements of the first partial grid are denoted in exemplary fashion by reference signs 61*a*, 61*b* and volume elements of the second partial grid are denoted in exemplary fashion by reference signs 62*a*, 62*b*.

Figure 7:
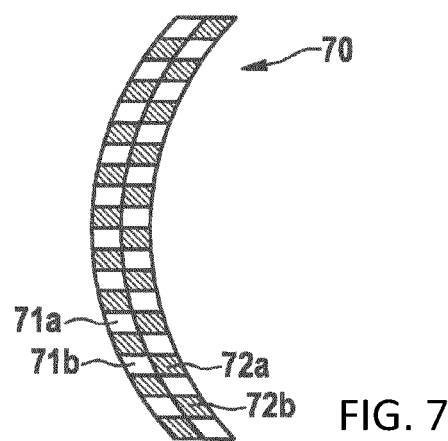
FIG. 7 shows a second exemplary embodiment of a spectacle lens according to the disclosure in cross section (schematic sketch).

FIG. 7 shows a second exemplary embodiment of a spectacle lens 70 in cross section (schematic sketch). In this exemplary embodiment, the entire spectacle lens 70 consists of a first volume element group with a plurality of first volume elements 71*a*, 71*b*, which are arranged in the style of grid points of a geometric grid, forming a first partial grid, and of a second volume element group with a plurality of second volume elements 72*a*, 72*b*, which are arranged in the style of grid points of a geometric grid, forming a second partial grid. In principle, the embodiment corresponds to the arrangement of the two partial grids in relation to one another as shown in FIGS. 1 and 5A.

Figure 8:
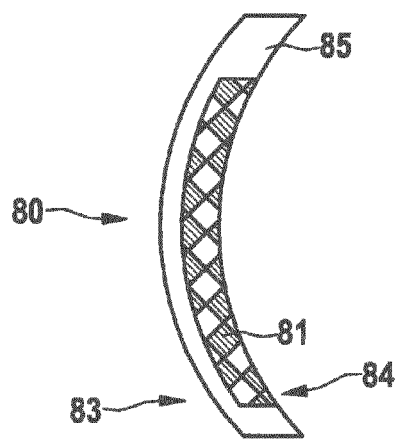
FIG. 8 shows a third exemplary embodiment of a spectacle lens according to the disclosure in cross section (schematic sketch).

FIG. 8 shows a third exemplary embodiment of a spectacle lens 80 in cross section (as a schematic sketch). In this exemplary embodiment, the structure 81 according to the disclosure is applied to the back side (eye side) 84 of a transparent carrier 85 in the form of a buried structure. The front side (object side) 83 of the spectacle lens 80 can have a spherical, toric, rotationally symmetric aspherical, or aspherical embodiment (e.g., as a free-form surface).

Figure 9:
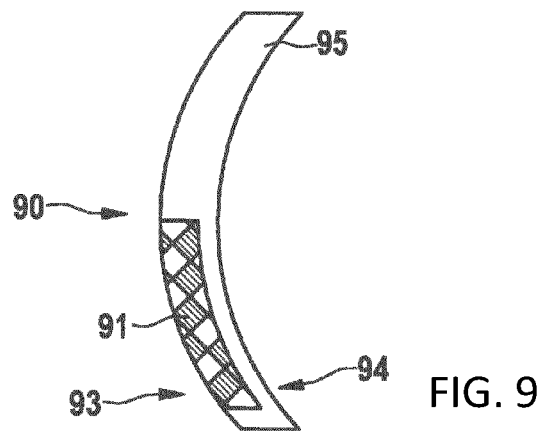
FIG. 9 shows a fourth exemplary embodiment of a spectacle lens according to the disclosure in cross section (schematic sketch).

A fourth exemplary embodiment of a spectacle lens 90 in cross section (in the form of a schematic sketch) can be gathered from FIG. 9. In this exemplary embodiment, the structure 91 according to the disclosure is applied to the front side (object side) 93 of a transparent carrier 95 in the form of a buried structure. The back side (eye side) 94 of the spectacle lens 90 can have a spherical, toric, or aspherical embodiment (e.g., as a free-form surface).

Coatings, such as, for example, hard coats, antireflection coatings, anti-adhesion coatings and the like, can be applied to one or both optically effective surfaces 83, 84, 93, 94 of the spectacle lenses 80, 90.

Figure 10:
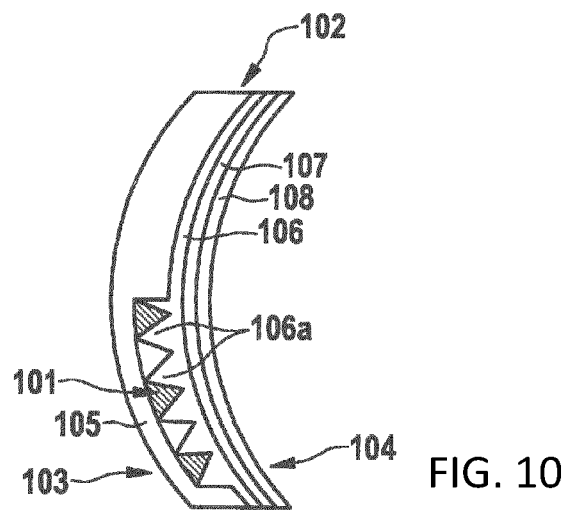
FIG. 10 shows a fifth exemplary embodiment of a spectacle lens according to the disclosure in cross section (schematic sketch).

FIG. 10 shows a fifth exemplary embodiment of a spectacle lens 102 according to the disclosure in cross section in the form of a schematic sketch. In this exemplary embodiment, the structure 101 according to the disclosure is applied to a part of the back side (eye side) 104 of a transparent carrier 105 in the form of a buried structure. The front side (eye side) 103 of the spectacle lens 102 can have a spherical, toric, or aspherical embodiment (e.g., as a free-form surface). A smoothing hard coat 106 that also fills the interstices 106*a* of the buried structure, an adhesion promoter layer 107, and an antireflection coating 108 having a plurality of individual layers is applied to the buried structure 101.

Express reference is made herewith to the fact that structures 101 can also be applied to the carrier 105 on both the front and the back.

Figure 11:
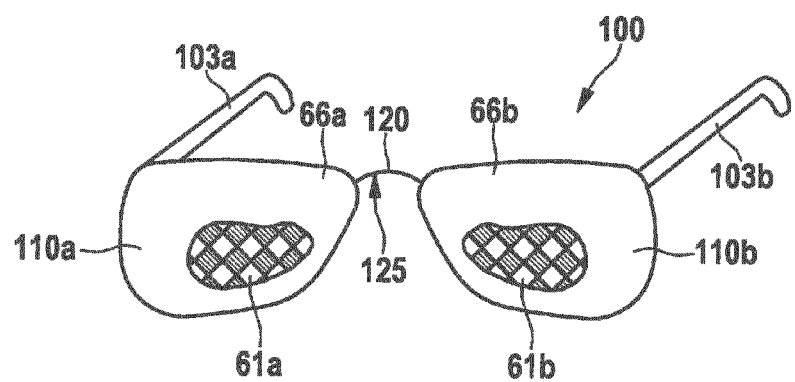
FIG. 11 shows an exemplary embodiment of spectacles with a spectacle lens according to the disclosure.

An exemplary embodiment of spectacles 100 with spectacle lenses 110*a*, 110*b* according to the disclosure can be gathered from FIG. 11. In addition to the two spectacle lenses 110*a*, 110*b*, the spectacles 100 comprise a spectacle frame 120, the bridge 125 and the two earpieces 130*a*, 130*b* of which are shown. Each spectacle lens 110*a*, 110*b* comprises a carrier 66*a*, 66*b*, each of which carries a structure 61*a*, 61*b* according to the disclosure of the type shown in FIG. 6. All constituent parts of the spectacles can be produced with the aid of a 3D printing method.

Typical features of the disclosure are the subject matter of the clauses reproduced below within the meaning of J15/88.

1. A spectacle lens (60, 70, 80, 90, 102, 110*a*, 110*b*), comprising a first volume element group, wherein the first volume element group comprises a plurality of first volume elements (1*a*, 1*b*, . . . ; 11*a*, 11*b*, . . . ; 51*a*, 51*b*, . . . ; 61*a*, 61*b*; 71*a*, 71*b*), wherein the plurality of first volume elements (1*a*, 1*b*, . . . ; 11*a*, 11*b*, . . . ; 51*a*, 51*b*, . . . ; 61*a*, 61*b*; 71*a*, 71*b*) are arranged in the style of grid points of a geometric grid so as to form a first partial grid, wherein the first volume elements (1*a*, 1*b*, . . . ; 11*a*, 11*b*, . . . ; 51*a*, 51*b*, . . . ; 61*a*, 61*b*; 71*a*, 71*b*) consist of a first material with a first Abbe number ($v_1$), a second volume element group, wherein the second volume element group comprises a plurality of second volume elements (2*a*, 2*b*, . . . ; 12*a*, 12*b*, . . . ; 52*a*, 52*b*, . . . ; 62*a*, 62*b*; 72*a*, 72*b*), wherein the plurality of second volume elements (2*a*, 2*b*, . . . ; 12*a*, 12*b*, . . . ; 52*a*, 52*b*, . . . ; 62*a*, 62*b*; 72*a*, 72*b*) are arranged in the style of grid points of a geometric grid so as to form a second partial grid, wherein the second volume elements (2*a*, 2*b*, . . . ; 12*a*, 12b, ...; 52a, 52b, ...; 62a, 62b; 72a, 72b) consist of a second material with a second Abbe number ($v_2$),
a) wherein
the first Abbe number ($v_1$) and the second Abbe number ($v_2$) differ from one another, and
the first partial grid and the second partial grid are arranged penetrating one another.

2. The spectacle lens (60, 70, 80, 90, 102, 110a, 110b) according to Clause 1, wherein
the first volume elements (1a, 1b, ...; 11a, 11b, ...; 51a, 51b, ...; 61a, 61b; 71a, 71b) of the first volume element group and the second volume elements (2a, 2b, ...; 12a, 12b, ...; 52a, 52b, ...; 62a, 62b; 72a, 72b) of the second volume element group interact at least partly in achromatic fashion.

3. The spectacle lens (60, 70, 80, 90, 102, 110a, 110b) according to Clause 1 or 2, wherein
the first Abbe number ($v_1$) is less than 40 and wherein
the second Abbe number ($v_2$) is greater than 40.

4. The spectacle lens (60, 70, 80, 90, 102, 110a, 110b) according to any of Clauses 1 to 3, wherein
the first material has a first refractive index ($n_1$) and wherein
the second material has a second refractive index ($n_2$) and wherein
the first refractive index ($n_1$) is greater than the second refractive index ($n_2$).

5. The spectacle lens (60, 70, 80, 90, 102, 110a, 110b) according to Clause 4, wherein
the first material is one from the group of polyethylene terephthalate (PET), polycarbonate (PC), polythiourethane (PTU) and polyepisulfide and/or wherein
the second material is one from the group of polymethyl (meth)acrylate (PMMA), polyallyldiglycol carbonate (PADC), polyurethane (PU), poly(meth)acrylate and polyacrylate.

6. The spectacle lens (60, 70, 80, 90, 102, 110a, 110b) according to Clause 4 or 5, wherein
the first material is one from the group of polymethyl (meth)acrylate (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA) and bisphenol A novolac epoxy resin (SU-8), with a first addition of a first concentration of nanoparticles from the group of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$) and silicon dioxide ($SiO_2$) and/or wherein
the second material is one from the group of polymethyl (meth)acrylate (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA) and bisphenol A novolac epoxy resin (SU-8), with a second addition of a second concentration of nanoparticles from the group of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$) and silicon dioxide ($SiO_2$).

7. The spectacle lens (60, 70, 80, 90, 102, 110a, 110b) according to any of the preceding clauses, wherein
the first volume elements (1a, 1b, ...; 11a, 11b, ...; 51a, 51b, ...; 61a, 61b; 71a, 71b) each have a volume of between 1000 $\mu m^3$ and 1 $mm^3$ and/or wherein
the second volume elements (2a, 2b, ...; 12a, 12b, ...; 52a, 52b, ...; 62a, 62b; 72a, 72b) each have a volume of between 1000 $\mu m^3$ and 1 $mm^3$.

8. The spectacle lens (60, 70, 80, 90, 102, 110a, 110b) having a front surface (3) and a back surface (4) according to any of the preceding clauses, wherein
the first partial grid is a three-dimensional grid and wherein the first volume elements (51a, 51b, ...) each have an at least approximately prismatic form with a respectively assigned prism base (B1) and wherein
the second partial grid is a three-dimensional grid and wherein the second volume elements (52a, 52b, ...) each have an at least approximately prismatic form with a respectively assigned prism base (B2) and wherein
a plurality of the first and second volume elements (51a, 52i) are in each case arranged in succession along the shortest imagined linear line extending from the back surface (4) to the front surface (3), wherein the plurality of successively arranged ones of the first and second volume elements (51a, 52i) are in each case arranged alternately, namely one of the first volume elements (51a) is in each case arranged adjacent to one of the second volume elements (52i), which in turn is arranged adjacent to one of the first volume elements, etc., and wherein the respective prism base (B1) of one of the first volume elements (51a) is arranged counter to the respective prism base (B2) in relation to one of the respectively adjacent ones of the second volume elements (52i).

9. The spectacle lens (60, 80, 90, 102, 110a, 110b) according to any of the preceding clauses, wherein
the spectacle lens (60, 80, 90, 102, 110a, 110b) comprises a carrier (63, 85, 95, 105, 66a, 66b) having a surface and wherein
the first volume element group and the second volume element group are arranged on the surface of the carrier (63, 85, 95, 105, 66a, 66b).

10. The spectacle lens (60, 70, 80, 90, 102, 110a, 110b) according to Clause 9, wherein
the carrier (85) has an object-side spherical or toric or free-form surface and wherein the surface on which the first volume element group and the second volume element group are arranged is the eye-side surface of the carrier (85), or wherein
the carrier (95, 105) has an eye-side spherical or toric or free-form surface and wherein the surface on which the first volume element group and the second volume element group are arranged is the object-side surface of the carrier (95, 105), or wherein
the surface on which the first volume element group and the second volume element group are arranged is the eye-side and/or the object-side surface of the carrier.

11. The spectacle lens (60, 80, 90, 102, 110a, 110b) according to any of the preceding clauses, characterized in that a coat (106, 106a, 107, 108) is arranged on the first volume element group and the second volume element group.

12. The spectacle lens (60, 80, 90, 102, 110a, 110b) according to any of the preceding clauses in the form of a virtual representation stored on a data carrier.

13. A computer-implemented method for designing a spectacle lens (60, 80, 90, 102, 110a, 110b) comprising the steps of:

providing a virtual representation of a first volume element group, wherein the first volume element group comprises a plurality of first volume elements (1a, 1b, . . . ; 11a, 11b, . . . ; 51a, 51b, . . . ; 61a, 61b; 71a, 71b), wherein the plurality of first volume elements (1a, 1b, . . . ; 11a, 11b, . . . ; 51a, 51b, . . . ; 61a, 61b; 71a, 71b) are arranged in the style of grid points of a geometric grid forming a first partial grid, wherein the first volume elements (1a, 1b, . . . ; 11a, 11b, . . . ; 51a, 51b, . . . ; 61a, 61b; 71a, 71b) consist of a first material with a first Abbe number ($v_1$), providing a virtual representation of a second volume element group, wherein the second volume element group comprises a plurality of second volume elements (2a, 2b, . . . ; 12a, 12b, . . . ; 52a, 52b, . . . ; 62a, 62b; 72a, 72b), wherein the plurality of second volume elements (2a, 2b, . . . ; 12a, 12b, . . . ; 52a, 52b, . . . ; 62a, 62b; 72a, 72b) are arranged in the style of grid points of a geometric grid forming a second partial grid, wherein the second volume elements (2a, 2b, . . . ; 12a, 12b, . . . ; 52a, 52b, . . . ; 62a, 62b; 72a, 72b) consist of a second material with a second Abbe number ($v_2$), wherein the first Abbe number ($v_1$) and the second Abbe number ($v_2$) differ from one another, and the first partial grid and the second partial grid are arranged penetrating one another.

14. A method for producing a spectacle lens (60, 80, 90, 102, 110a, 110b) comprising the steps of:

additive manufacturing of a first volume element group, wherein the first volume element group comprises a plurality of first volume elements (1a, 1b, . . . ; 11a, 11b, . . . ; 51a, 51b, . . . ; 61a, 61b; 71a, 71b), wherein the plurality of first volume elements (1a, 1b, . . . ; 11a, 11b, . . . ; 51a, 51b, . . . ; 61a, 61b; 71a, 71b) are arranged in the style of grid points of a geometric grid so as to form a first partial grid, wherein the first volume elements (1a, 1b, . . . ; 11a, 11b, . . . ; 51a, 51b, . . . ; 61a, 61b; 71a, 71b) consist of a first material with a first Abbe number ($v_1$), additive manufacturing of a second volume element group, wherein the second volume element group comprises a plurality of second volume elements (2a, 2b, . . . ; 12a, 12b, . . . ; 52a, 52b, . . . ; 62a, 62b; 72a, 72b), wherein the plurality of second volume elements (2a, 2b, . . . ; 12a, 12b, . . . ; 52a, 52b, . . . ; 62a, 62b; 72a, 72b) are arranged in the style of grid points of a geometric grid so as to form a second partial grid, wherein the second volume elements (2a, 2b, . . . ; 12a, 12b, . . . ; 52a, 52b, . . . ; 62a, 62b; 72a, 72b) consist of a second material with a second Abbe number ($v_2$), wherein the first Abbe number ($v_1$) and the second Abbe number ($v_2$) are arranged penetrating one another, and the first partial grid and the second partial grid differ from one another.

15. The method according to Clause 13 or 14, wherein the first and second volume elements (1a, 1b, . . . ; 11a, 11b, . . . ; 51a, 51b, . . . ; 61a, 61b; 71a, 71b; 2a, 2b, . . . ; 12a, 12b, . . . ; 52a, 52b, . . . ; 62a, 62b; 72a, 72b) are arranged in such a way that, along a predetermined light path through the spectacle lens (60, 80, 90, 102, 110a, 110b), they interact at least partly in achromatic fashion.

16. The method according to Clause 13, 14 or 15, wherein those of the first and second volume elements (51a, 52i) which are arranged in succession along a predetermined light path through the spectacle lens (60, 80, 90, 102, 110a, 110b) are embodied as prism elements (51a, 52i) or as lens elements (51a, 52i).

17. A computer program having program code for carrying out all method steps according to Clause 13 or according to either of Clauses 15 and 16 referring back indirectly or directly to Clause 12 when the computer program is loaded in a computer and/or executed in a computer.

18. The method according to Clause 14 or according to either of Clauses 15 and 16 referring back indirectly or directly to Clause 13, characterized by the step of additive manufacturing of a carrier (63, 85, 95, 105, 66a, 66b) having a surface, on which the first volume element group and the second volume element group are arranged.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising:
a first volume element group including a plurality of first volume elements arranged on grid points of a geometric grid to form a first partial grid, wherein the first volume elements include a first material with a first Abbe number; and
a second volume element group including a plurality of second volume elements arranged on grid points of a geometric grid to form a second partial grid, wherein the second volume elements include a second material with a second Abbe number,
wherein the first partial grid and the second partial grid are arranged penetrating one another,
wherein the first Abbe number and the second Abbe number differ from one another, and
wherein the first volume elements of the first volume element group and the second volume elements of the second volume element group jointly are configured at least partly as an achromat.

2. The spectacle lens as claimed in claim 1, wherein the first Abbe number is less than 40 and the second Abbe number is greater than 40.

3. The spectacle lens as claimed in claim 1, wherein the first material has a first refractive index and the second material has a second refractive index, and wherein the first refractive index is greater than the second refractive index.

4. The spectacle lens as claimed in claim 3, wherein at least one of:
the first material is selected from the group consisting of polyethylene terephthalate (PET), polycarbonate (PC), polythiourethane (PTU), and polyepisulfide, or
the second material is selected from the group consisting of polymethyl(meth)acrylate (PMMA), polyallyldiglycol carbonate (PADC), polyurethane (PU), poly(meth)acrylate, and polyacrylate.

5. The spectacle lens as claimed in claim 3, wherein at least one of:
the first material is selected from the group consisting of polymethyl(meth)acrylate (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA) and bisphenol A novolac epoxy resin (SU-8), and a first addition of a first concentration of nanoparticles selected from the group consisting of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$), and silicon dioxide ($SiO_2$), or
the second material is selected from the group consisting of polymethyl(meth)acrylate (PMMA), polyallyldiglycol carbonate (PADC), polyurethane (PU), polyacrylate, polyethylene terephthalate (PET), polycarbonate (PC), polythiourethane (PTU), polyepisulfide, hexanediol diacrylate (HDODA), diethylene glycol diacrylate (DEGDA), and bisphenol A novolac epoxy resin (SU-8), and a second addition of a second concentration of nanoparticles selected from the group consisting of beryllium oxide (BeO), aluminum nitride (AlN), silicon carbide (SiC), zinc oxide (ZnO), zinc sulfide (ZnS), zirconium oxide ($ZrO_2$), yttrium orthovanadate ($YVO_4$), titanium dioxide ($TiO_2$), copper sulfide ($CuS_2$), cadmium selenide (CdSe), lead sulfide (PbS), molybdenum disulfide ($MoS_2$), and silicon dioxide ($SiO_2$).

6. The spectacle lens as claimed in claim 1, wherein at least one of:
the first volume elements each have a volume of between 1000 $\mu m^3$ and 1 $mm^3$, or
the second volume elements each have the volume of between 1000 $\mu m^3$ and 1 $mm^3$.

7. The spectacle lens as claimed in claim 1, further comprising:
the spectacle lens having a front surface and a back surface,
wherein at least one of:
the first partial grid is a three-dimensional grid and the first volume elements each have an at least approximately prismatic form with a respectively assigned prism base, or
the second partial grid is a three-dimensional grid and the second volume elements each have an at least approximately prismatic form with the respectively assigned prism base,
wherein a plurality of first and second volume elements are in each case arranged alternating in succession along a shortest linear line extending from the back surface to the front surface, and
wherein a prism base of each of the first volume elements is arranged counter to the respective prism base of the adjacent the second volume elements, respectively.

8. The spectacle lens claimed in claim 1, further comprising:
a carrier having a surface, wherein the first volume element group and the second volume element group are arranged on the surface of the carrier.

9. The spectacle lens as claimed in claim 8, further comprising:
the carrier having an object-side spherical or toric or free-form surface and the first volume element group and the second volume element group being arranged on an eye-side surface of the carrier, or
the carrier having an eye-side spherical or toric or free-form surface and the first volume element group and the second volume element group being arranged on the object-side surface of the carrier, or
the first volume element group and the second volume element group being arranged on at least one of the eye-side surface of the carrier or the object-side surface of the carrier.

10. The spectacle lens as claimed in claim 1, further comprising:
a coat being arranged on the first volume element group and the second volume element group.

11. A model of a spectacle lens as claimed in claim 1, the model being stored on a data carrier and generated by a method comprising:
providing a virtual representation of a first volume element group having a plurality of first volume elements made from a first material with a first Abbe number;
arranging the plurality of first volume elements on grid points of a geometric grid to form a first partial grid;
providing a virtual representation of a second volume element group having a plurality of second volume elements made from a second material with a second Abbe number;
arranging the plurality of second volume elements on grid points of a geometric grid to form a second partial grid;
wherein the first Abbe number and the second Abbe number differ from one another,
wherein the first partial grid and the second partial grid are arranged penetrating one another, and
wherein the first and second volume elements are arranged along a predetermined light path through the spectacle lens to interact at least partly as an achromat.

12. A computer-implemented method for designing a spectacle lens, the method comprising:
providing a virtual representation of a first volume element group having a plurality of first volume elements made from a first material with a first Abbe number;
arranging the plurality of first volume elements on grid points of a geometric grid to form a first partial grid;
providing a virtual representation of a second volume element group having a plurality of second volume elements made from a second material with a second Abbe number;
arranging the plurality of second volume elements on grid points of a geometric grid to form a second partial grid;
wherein the first Abbe number and the second Abbe number differ from one another,
wherein the first partial grid and the second partial grid are arranged penetrating one another, and
wherein the first and second volume elements are arranged along a predetermined light path through the spectacle lens to interact at least partly as an achromat.

13. The method as claimed in claim 12, wherein the first and second volume elements arranged in succession along the predetermined light path through the spectacle lens are configured as prism elements or as lens elements.

14. A computer program stored on a non-transitory storage medium and having program code for carrying out all method steps as claimed in claim 12 when the computer program is loaded in a computer and/or executed in a computer.

15. The method as claimed in claim 12, further comprising:
manufacturing of the first and second volume element groups by additive manufacturing.

16. The method as claimed in claim 15, further comprising:
manufacturing a carrier by additive manufacturing, wherein the carrier has a surface on which the first volume element group and the second volume element group are arranged.

17. A spectacle lens comprising:
a first volume element group having a plurality of first volume elements, wherein the plurality of first volume elements is arranged on grid points of a geometric grid configured to form a first partial grid, wherein the first volume elements are made of a first material with a first Abbe number;
a second volume element group having a plurality of second volume elements, wherein the plurality of second volume elements is arranged on grid points of a geometric grid configured to form a second partial grid, wherein the second volume elements are made of a second material with a second Abbe number;
wherein the first partial grid and the second partial grid are configured to penetrate one another,
wherein the first Abbe number and the second Abbe number differ from one another, and
wherein the individual first and second volume elements are configured such that a quotient of a transverse chromatic aberration $\Delta\delta_{chrom}$ of a comparison spectacle lens, which is manufactured exclusively from the first material, and a transverse chromatic aberration $\Delta\delta_{chrom}$ of the spectacle lens having a same dioptric power distribution at a same location on the spectacle lens as the comparison spectacle lens, is greater than 1.

18. The spectacle lens according to claim 17, wherein the value of the quotient is greater than 2.

19. The spectacle lens according to claim 17, wherein the value of the quotient is greater than 3.

20. A computer-implemented method for designing a spectacle lens, the method comprising:
providing a virtual representation of a first volume element group having a plurality of first volume elements, wherein the plurality of first volume elements is arranged on grid points of a geometric grid forming a first partial grid, and wherein the first volume elements are made of a first material with a first Abbe number;
providing a virtual representation of a second volume element group having a plurality of second volume elements, wherein the plurality of second volume elements is arranged on grid points of a geometric grid forming a second partial grid, wherein the second volume elements are made of a second material with a second Abbe number, and wherein the first Abbe number and the second Abbe number differ from one another;
arranging the first partial grid and the second partial grid to penetrate one another;
predetermining a light path through the spectacle lens; and
arranging the first volume elements and the second volume elements in succession along the predetermined light path through the spectacle lens, wherein the first volume elements and the second volume elements are shaped and connected to one another at mutually complementary surfaces to attenuate a transverse chromatic aberration for two wavelengths.

* * * * *